Oct. 12, 1943.  R. L. BALDWIN ET AL  2,331,368
MECHANICAL GUN AND PROJECTOR
Filed March 18, 1941
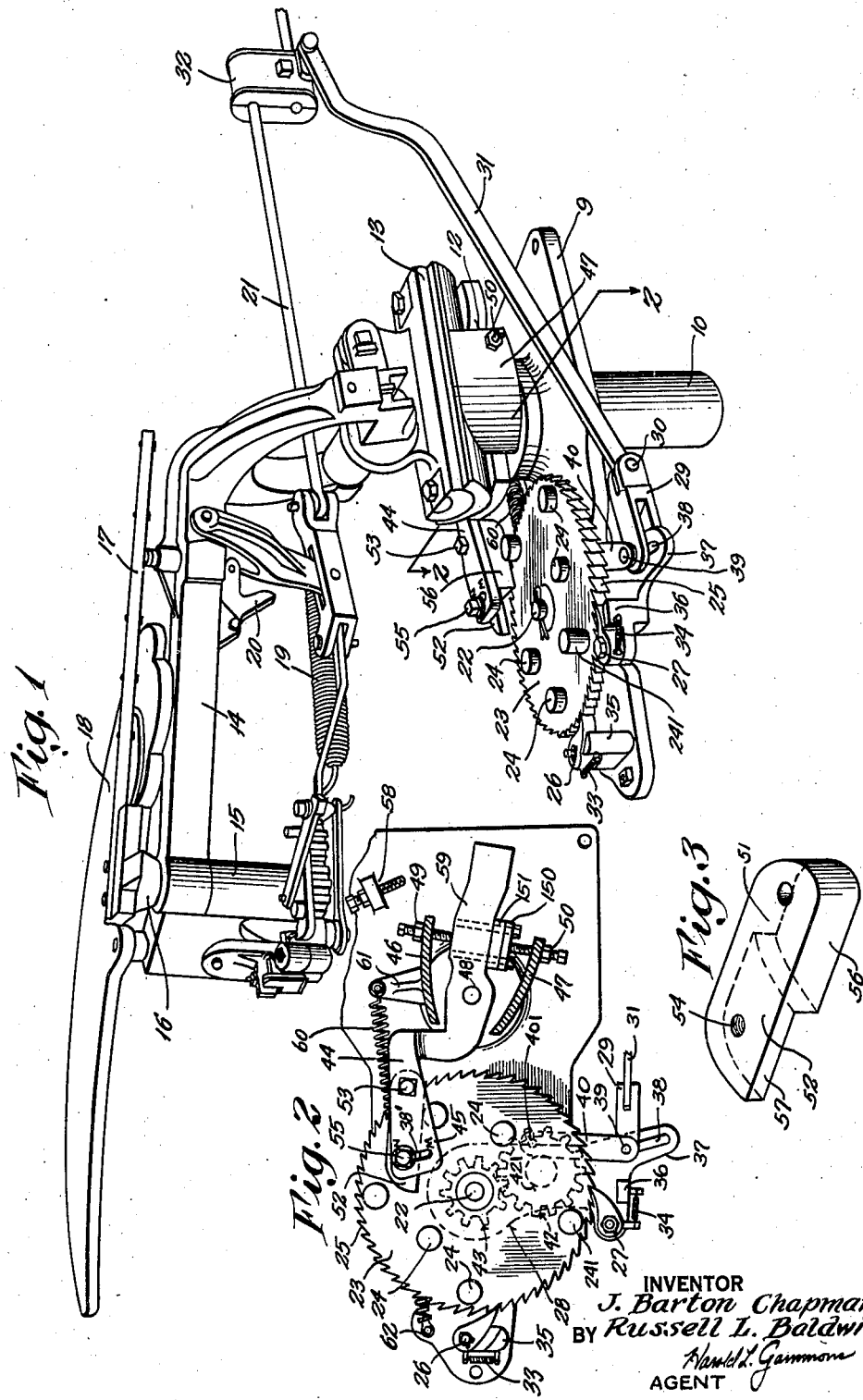
INVENTOR
J. Barton Chapman
BY Russell L. Baldwin
Harold L. Gammons
AGENT Patented Oct. 12, 1943

2,331,368

UNITED STATES PATENT OFFICE 2,331,368

MECHANICAL GUN AND PROJECTOR

Russell L. Baldwin, Findlay, Ohio, and John B. Chapman, Stamford, Conn., assignors to Remington Arms Company, Inc., a corporation of Delaware Application March 18, 1941, Serial No. 383,902

10 Claims. (Cl. 124—9)

This invention relates to target throwing traps, and contemplates means for readily varying the angle of spread of the targets thrown.

In the sport known as "trapshooting" frangible targets, usually of saucer shape, are projected from a target throwing device, commonly called a "trap," and the shooters occupy one of five different positions in a direction generally rearwardly from the trap and sixteen to twenty-five yards distant therefrom. Targets are projected by the trap in varying directions, the direction of projection being ordinarily under the control of the trap operator, although mechanical devices for automatically controlling the direction of the target have been proposed and have had a limited use.

In different locations and for different purposes different angles of spread of the targets are desired. The minimum angle of spread in common use is about 40°, that is 20° on either side of a medial line from the trap to the center shooting post. Under some conditions it is desirable that this spread be increased to about 60°, or 30° on either side of a medial line. It is further desirable that varied distribution of the targets throughout the angle of spread be uniform and that it remain uniform when the angle of spread is changed. The present invention contemplates an apparatus for the accomplishment of these objects.

In the drawing:

Fig. 1 is a perspective view of one form of target throwing trap having the device of the present invention applied thereto.

Fig. 2 is a horizontal section, substantially on the line 2—2 of Fig. 1.

Fig. 3 is a perspective of an element of the trap positioning mechanism.

The trap comprises a fixed support 9 preferably of cast metal provided with a vertically disposed journal 10 which receives a boss or trunnion projecting downwardly from a trap base 12 which is integral with or secured to a trap frame 13. It will be understood that the particular trap illustrated in the drawing and to be described has been selected for purpose of illustration only, and that the angle controlling mechanism is applicable to many other types of traps. In said illustrative trap, the top of the base 12 is in the form of a longitudinally extending cradle which receives a corresponding shaped counterpart portion on the base of the frame 13, thereby permitting the lateral tilting or levelling of the trap. The frame 13 comprises a forwardly extending arm 14 provided with a journal 15 which receives a pivot 16 of a target throwing arm 17. In some traps the target throwing arm is rigidly connected with a target support or "shovel carrier," but in the trap illustrated the target is supported upon a planar table 18. Associated with the target throwing arm 17 is a throwing spring 19 designed, when the throwing arm is released, to sweep said arm across the table 18 and project a target therefrom, and any suitable form of release mechanism, indicated generally by numeral 20, and any suitable form of spring cocking mechanism. Details of the release and cocking mechanism are not material to the present invention; it is sufficient to say that the throwing spring 19 is cocked and the throwing arm 17 moved into proper position to project a target by the forward motion of an operating rod 21 (operated by a suitable lever, not shown) and that the release mechanism is actuated to permit the throwing movement of the arm under the energy of spring 19 by a short rearward movement of the same link.

It will be obvious that the direction in which the target is projected may be controlled by the angular position of the trap frame 13 and base 12 with respect to the fixed support 9 in which the base 12 is pivoted, as heretofore described. The automatic angle varying mechanism for moving and holding the trap in a desired angular position is constructed as follows:

Upon a trunnion 22 secured near the forward end of base 9 is pivoted a ratchet disk 23. Projecting upwardly from said ratchet disk are a suitable number of positioning studs 24, said studs being irregularly positioned and at least one of them, identified as 24I, being of greater height than the others. The periphery of disk 23 is provided with ratchet teeth 25 adapted for engagement by a retaining pawl 26 pivoted on support 9 and an actuating pawl 27 carried on an arm 28 pivoted concentrically with the disk 23. Adjustably connected to arm 28 is a link 29 having a pivotal connection at 30 with a connecting link 31 joined to the trap cocking and release rod 21 at 32. Suitable springs 33 and 34 and spring abutment studs 35 and 36 maintain yielding contact of pawls 26 and 27 respectively with the ratchet teeth 25. It will be apparent that upon reciprocation of the trap operating rod 21 the connecting link 31 is reciprocated and the ratchet disk 23 is rotated by pawl 27 through an angle determined by the length of the stroke of rod 21. The stroke of rod 21 tends to be uniform and thus to advance disk 23 in equal increments. To provide for variation in the angular rotation of disk 23 and the studs thereon in successive revolutions of said disk, the number of teeth 25 on ratchet disk 23 is not an even multiple of the number of teeth 25 traversed by pawl 27 on a single movement. In furtherance of this end, suitable indexing mechanism is provided for causing the actuating pawl 27 to engage a substantially different number of ratchet teeth 25 corresponding to each new angle of the target throwing frame 13. As shown in Fig. 2, the pawl carrying mechanism comprises an arm 28 having the actuating pawl 27 pivotally secured at one end thereof and rotatable, at its opposite end, about the trunnion 22 of the ratchet disk 23. The projecting end 37 of the arm 28 is provided with a slot 38 in which a pin 39 connecting one end of a crank arm 40 to a link 29 is adapted to reciprocate. Reciprocation of the pin is effected by the motion of the crank arm 40, which is eccentrically pinned at its opposite end 401 to the upper surface of a horizontally disposed spur gear 42 rotatively mounted as at 421 on the pivoted arm 28 and in driving engagement with a second spur gear 43 keyed to the ratchet disk trunnion 22. As the ratchet disk rotates the spur gear 43 drives the gear 42 which reciprocates the arm 40 and hence changes the position of the connecting pin 39 and connecting rod link 29 relative to the trunnion 22 of the arm 28, thereby changing the effective length of the connecting link 31. Thus, for successive thrusts or pulls of substantially equal length on the connecting link 31, the arm 28 is successively pivoted about the trunnion 22 through unequal arcs and hence the pawl 27, carried thereby, successively engages a substantially different number of teeth 25 on the ratchet disk 23 whereby the latter is intermittently rotated through continuously varying angles. The retaining pawl 26 prevents the rotation of the disk 23 in a counterclockwise direction.

The mechanism for effecting a substantially uniform distribution of the continuously varying angles of the frame throughout the field of target distribution (hereinafter defined) comprises the aforesaid lugs or protuberances 24, 241 integrally formed on or otherwise secured to the upper face of the ratchet disk 23 and radially disposed so as to engage and rotate a projecting frame member or frame arm indicated generally by numeral 44 whereby both frame and base 13 and 12 respectively are rotated relative to the fixed support 9. It will be clear from the drawing that the protuberances 24, 241 are not symmetrically disposed over the face of the disk 23, the disposition of these lugs, taken in conjunction with the rotation of the ratchet disk 23 through continuously varying angles, being such that the resultant effect on the angular rotation of the frame 13 is to rotate the frame through successive unpredictable angles while maintaining a substantially uniform distribution of such unpredictable angles over the field of target distribution. That is to say, during substantially continuous operation of the trap, thrown targets will be distributed substantially uniformly over the entire field even though the targets are thrown successively at unpredictable angles. The terms "field of target distribution," "angular spread," "the field," or equivalent terms as used herein, shall be understood to mean the entire angle through which the target trap, or trap frame, moves in rotating from its maximum position to the right of the medial line to its maximum left hand position.

The "medial line" is a line from the trap frame through the center of the field of target distribution, bisecting the angle formed by the line of flight of an extreme left target and the line of flight of an extreme right target and is the line of flight of a "straight-away" (no angle either right or left) from the center shooting post. It is desirable that, as the field is widened and narrowed, this line remain fixed.

Referring to Fig. 2, the frame member 44 is shown as an angular bar, substantially rectangular in cross section and having an arcuate slot 38' formed in its flared end 45. The arm is shown mounted between the spaced legs 46 and 47 of the base 12 and is provided with a hole in axial alignment with the vertical axis of the frame to receive a shaft 48, whereby the arm may be laterally adjusted relative to the frame. Suitable adjusting screws 49 and 50, mounted on each leg 46 and 47 respectively of the base, normally engage opposed parts of the rear end 59 of the arm so as to secure it against movement relative to the frame. As shown, the adjusting screw 49 engages the right side of the arm while the screw 50 is adapted to engage a bearing plate 150 suitably secured to the left side of the arm by a pair of screws. 151 represents a block or plate of rubber or neoprene secured between the bearing plate 150 and the side of the arm for absorbing the shock to the frame which occurs when the trap is suddenly halted in its ponderous swing from a maximum position to one side of the medial line to an extreme position on the other. While rubber or neoprene have been suggested as materials suitable for this purpose, it will be understood that materials having similar shock-absorbing properties are regarded as being within the scope of the present invention. The adjusting screws provide the means for adjusting the trap frame for various windage conditions without necessitating adjustments of the automatic angle varying mechanism hereinbefore described; it is believed to be clear that for a prevailing wind from the left the frame 13 would be turned slightly to the left relative to the arm 44 by a simple adjustment of the screws 49 and 50—no other adjustments being necessary.

A shoe 51 (Fig. 3) comprising a substantially rectangular block having a projecting finger portion 52, is arranged to be pivotally secured at one end beneath the undersurface of the flared or slotted end 45 of the frame arm 44 by a suitable bolt 53. The finger end 52 of the shoe is provided with a tapped hole 54 adapted to threadedly engage an adjusting screw 55 projecting through the arcuate slot 38', whereby the shoe may be adjusted through an arc defined by the length of the slot 38'. In the device shown the arcuate slot 38' is marked at its ends by the letters N and W, which designate "narrow" and "wide" respectively for the purpose hereinafter described. The surfaces 56 and 57 of the shoe 51, hereinafter designated as cam surfaces, are adapted to be engaged by the lugs 24 and 241 of the rotating disk 23; the elevation of the cam surface 57 relative to the plane of the disk 23 is such that the low lugs 24, after having engaged the cam surface 56 and effecting various minimum angular displacements of the frame to the right or left of the medial line, pass underneath the cam 57 and are thereafter ineffective; while the high lug 241 is adapted to contact with the cam surface 57 to move the frame arm and consequently rotate the frame 13 a maximum distance to the right of the medial line of the field of target distribution. Furthermore, assuming, for example, that lug 24I contacts cam 57, and frame 13 is displaced to its maximum position to the right of the medial line, it will be evident that this maximum position may be readily varied by adjustment of the pivoted shoe 5I in the slot 38. When the shoe is in its "N" position a maximum displacement of the frame 13 to the right of the medial line will be approximately 20°. By moving the shoe about pivot bolt 53 to its "W" position, the maximum displacement of the frame will be increased at once to substantially 30° to the right of the medial line.

It should be noted that the shoe 5I is pivoted to arm 44 at a point in the region of the periphery of ratchet disk 23 rather than at a point remote from the ratchet disk, such as pivot 48 of arm 44. By so locating the pivot of shoe 5I, the distribution of targets in the wide angle field becomes a function of the radial spacing of the several lugs 24 so that the uniform distribution of targets in the narrow field is maintained in the wide field as well.

Although the above angles are particularly adapted to the invention as shown and described, it will be understood that this invention is not limited thereby and that variations in the angles specified may be made within the scope of the appended claims. It is to be particularly emphasized that by the adaptation of the adjustable shoe to the arm 44 the angle of the field of target distribution to the right of the medial line may be readily varied from a maximum of substantially 20° to a maximum of substantially 30°, but that no adjustment is necessary or effected in the automatic angle varying mechanism, and hence the uniform distribution of angles or of targets thrown at such angles as hereinbefore described remains substantially unchanged.

The maximum angular displacement of the frame 44 to the left of the medial line is not limited by a disk lug but by an adjustable screw 58 suitably mounted on the fixed support 9 and adapted to be engaged by the rear end 59 of the frame arm 44 which, as shown, projects an appreciable length through the legs 46 and 47 of the base 12. By means of this adjusting screw the maximum angle of the field of distribution to the left of the medial line may be varied to correspond to the variations effected in the angle of the field to the right of the medial line. The frame carrying arm 44 is urged in a counterclockwise direction (Fig. 2) by a coil spring 60 suitably secured at one end to an arm bracket 6I on the base 12; the opposite end of the spring being secured to a post 62 on the extreme forward end of the fixed supporting member 9.

The operation of the trap is as follows: When the operating lever (not shown) is moved forward, both the connecting rod 2I and the connecting link 3I are moved an equal distance forwardly. The movement of the connecting rod 2I effects release of the trigger 20 of the throwing arm 17, whereby the latter sweeps a target from the target carrying plate 18. The movement of the link 3I pivots the arm 28 clockwise about the trunnion 22 and carries the actuating pawl back over an unpredictable number of teeth 25 on the ratchet disk 23. During this motion the disk 23 is motionless. Subsequently, when the pull rod is pulled backward, the connecting rod 21 cocks the throwing arm 17 in the well known manner while the connecting link 3I rotates the arm 28 counterclockwise and hence causes the pawl 27 to rotate the ratchet disk 23 through an indeterminate angle dependent upon the effective length of the connecting link 3I which in turn is determined by the rotation of the spur gears 43 and 42 and the resulting reciprocation of the connecting arm 40 and connecting pin 39 in slot 38. Rotation of the disk 23 causes the lugs or protuberances 24 or 24I each in turn to engage respective cam faces 56 or 57 of the adjustable shoe 5I and pivot the arm 44 about the shaft 48. Since the arm 44 is normally held in fixed position relative to the trap frame or base 13 by the adjusting screws 49 and 50, the trap frame is caused to turn through an unpredictable angle of the field of target distribution and, as previously described, during substantially continuous operation of the trap, the distribution of successive unpredictable angular settings of the swinging trap frame through the field of target distribution will be substantially uniform. When it is desired to vary the angle of the field from an angular spread of 40° to 60°, or any intermediate angle, the adjustment may be made simply by loosening the adjusting screw 55 and pivoting the shoe 5I from the "N" position to the "W" position, and making a corresponding adjustment of screw 58. It will be appreciated that this simple adjustment is entirely independent of the automatic angle varying mechanism and hence the uniform distribution of unpredictable angles or of targets thrown at such angles remains undisturbed.

The present invention embodies new and useful features which combine to form a superior target throwing trap having mechanism adapted to automatically vary the angular distribution of thrown targets in such a manner that the placement of any target is not predictable while the distribution of a series of targets throughout the field of distribution is substantially uniform in fields of varying width, and such fields may be shifted as desired or to compensate for windage.

While forms or apparatus herein described constitute preferred embodiments of the invention, it is to be understood that the invention is not limited to these precise forms or apparatus and that changes may be made in either without departing from the scope of the invention which is defined in the appended claims.

What is claimed is:

1. In a target throwing trap adapted to automatically distribute a succession of targets within a field, in combination, a fixed support, a frame having a target throwing arm pivotally supported thereon, said frame comprising spaced leg portions, a pin for pivotally mounting said frame on said support, means for moving said frame relative to said support, said means comprising an arm pivotally mounted on said pin and projecting between the spaced leg portions of said frame, screws carried by said leg portions for oppositely engaging and adjusting said arm relative to said frame whereby the trap may be corrected for windage variations, and means secured to said arm and adjustable relative thereto for varying the width of the field of target distribution while maintaining a substantially uniform distribution of targets throughout said field.

2. In a target throwing trap adapted to automatically distribute a succession of targets within a field, in combination, a fixed support, a frame having a target throwing arm pivotally supported thereon, said frame comprising spaced parallel legs, a pin for pivotally mounting said frame on said support, means for moving said frame relative to said fixed support, said means comprising an arm pivotally mounted on said pin and projecting between the spaced legs, an adjusting screw carried by each frame leg for oppositely engaging and positioning said arm relative to said frame, whereby the direction of throw of the trap may be corrected for windage variations, a shoe pivotally attached to said arm and adjustable relative thereto for varying the width of target distribution, intermittently rotated members adapted to engage the adjustable shoe, and pawl actuated means carried on said fixed support for rotating said members, said pawl being actuated as an incident to the throwing of a target.

3. In a target throwing trap adapted to uniformly distribute a succession of targets within a field, in combination, a fixed support, a frame rotatably carried on said support, a target supporting plate mounted on said frame, a target throwing arm pivotally supported by said frame and adapted to sweep a succession of targets from said plate, a slotted arm projecting from said frame, means including a rotatable ratchet disk on said support having lugs thereon for engaging said slotted arm to automatically rotate said frame through unpredictable angles, a pair of adjusting screws on said frame for oppositely engaging and adjusting said slotted arm relative to said frame whereby the direction of throw of the trap may be corrected for windage variations, an adjusting screw on said fixed support to engage said arm and thus limit the angular displacement of said slotted arm in one direction whereby the width of the field of target distribution may be varied, and a shoe pivotally secured to said slotted arm and having securing means passing through the slot of said arm for adjusting said shoe relative to said arm and having a pair of lug engaging surfaces adapted to be engaged by certain lugs of said ratchet disk respectively for varying the width of the field of target distribution while maintaining substantially uniform distribution of targets throughout said field.

4. In a target throwing trap adapted to distribute a succession of targets throughout a field, in combination, a base, a frame rotatably supported from said base and supporting a pivotally mounted throwing arm, means for shifting said frame with respect to said base as an incident to the operation of said trap to throw a target, said means comprising an arm projecting from said frame, devices for adjusting said arm with respect to said frame, a shoe adjustably mounted adjacent the free end of said arm for movement relative thereto and comprising lug-engaging surfaces in two planes, a member rotatably mounted on said base and comprising lugs of varying height adapted to contact certain of said lug-engaging surfaces respectively, and means for moving said member with respect to said arm, said member-moving means being actuated as an incident to the throwing of a target.

5. In a target throwing trap adapted to distribute a succession of targets throughout a field, in combination, a base, a frame rotatably supported from said base, a target throwing arm carried by said frame, means for shifting said frame with respect to said base as an incident to the operation of said trap to throw a target, said means comprising an arm projecting from said frame, a pair of adjusting screws carried by said frame for oppositely engaging and adjusting said arm with respect to said frame, a pivoted shoe secured adjacent the free end of said arm and adjustable relative thereto and comprising lug-engaging surfaces in two planes, a rotatable ratchet disk on said base having lugs of varying height adapted to contact certain of said lug-engaging surfaces respectively, an eccentric and a pawl adjusted by said eccentric for rotating said ratchet disk with respect to said arm, said pawl being actuated concurrently with the release of a target.

6. In a target throwing trap adapted to automatically distribute a succession of targets uniformly and at unpredictable angles within a field, in combination, a fixed support, a frame carried by said support, a target throwing arm carried by said frame, means for rotating said frame relative to said support comprising an arm carried by said frame, indexing means rotatable on said support and adapted to engage said arm, resilient means secured to said fixed support and to the movable frame respectively for restraining the arm in engagement with said indexing means, a pair of adjusting screws carried by said frame for oppositely engaging and adjusting said arm relative to the frame, and a bearing plate resiliently mounted on said arm and engaged by one of said adjusting screws to cushion the shock sustained by said arm when said arm is released from engagement with said indexing means and is swung by said resilient restraining means into reengagement with said indexing means.

7. In a target throwing trap adapted to distribute a succession of targets throughout a field, in combination, a base, a trap frame supported on said base, a target throwing arm supported by said frame, means for shifting said frame through said field, said shifting means comprising an arm projecting from said frame, a shoe pivoted at one end of said arm and adjustable relative thereto having cam surfaces for varying the width of the field of target distribution, an intermittently rotated disk supported on said base having dissimilar lugs thereon, some of which are adapted to engage one of said cam surfaces, an eccentrically driven crank arm, and a member controlled by said crank arm as an incident to the actuation of the target throwing arm for rotating said disk with respect to said arm.

8. In a target throwing trap adapted to distribute a succession of targets throughout a field having a certain medial line in combination, a base, a trap frame supported on said base and having a target throwing arm, means for pivoting said frame on said base, said means comprising indexing means rotatably supported on said base and constructed and arranged to shift said frame through unpredictable angular positions within said field, an arm movable with said frame, said frame being positioned on said base in such relation to said medial line that targets thrown by said target throwing arm will be distributed throughout said field substantially uniformly on each side of said medial line, field varying means carried by said frame arm, and means carried on said arm to enable manual adjustment of said field varying means with respect to said frame arm without changing the position of said frame with relation to said medial line, said field varying means being engaged by said indexing means for varying the width of the field while maintaining a substantially uniform and unpredictable distribution of targets throughout a field having the same medial line.

9. In a target throwing trap adapted to uniformly distribute a succession of targets within a field, in combination, a fixed support, a frame supported from said support adapted to carry a target throwing arm, means for moving said frame relative to said support, said means comprising an arm carried by said frame, a shoe carried by said arm, shoe securing means for adjusting said shoe relative to said arm, said shoe having cam surfaces in different planes, a ratchet disk rotatable on said fixed support having dissimilar lugs thereon, some of which are adapted to engage one only of the cam surfaces and others of which are adapted to engage all of said cam surfaces, a pair of adjusting screws on said frame for oppositely engaging and adjusting the arm relative to the frame whereby the trap may be corrected for windage variations, an adjusting screw on said support to engage said arm and thus limit the angular displacement of said arm, whereby the width of the field of target distribution may be varied in one direction, a pawl for actuating said ratchet disk thereby moving said dissimilar lugs into engagement with their respective cam surfaces thereby rotating said frame, an eccentrically driven crank arm, and means adjusted by said crank arm for controlling the actuation of said pawl, said adjusted means being actuated concurrently with the throwing of a target.

10. In a target throwing trap adapted to distribute a succession of targets throughout a field having a certain medial line, in combination, a fixed base, a trap frame having a target throwing arm pivotally mounted on said base, means for pivotally moving said frame on said base as an incident to the cocking of said target throwing arm through a sequence of positions such as to distribute targets substantially uniformly throughout said field, means carried by the frame for varying the width of said field of target distribution while maintaining a substantially uniform distribution with respect to said medial line, and means enabling manual adjustment of said field varying means.

RUSSELL L. BALDWIN.
JOHN B. CHAPMAN.